United States Patent [19]

Kawahara et al.

[11] Patent Number: 4,758,883
[45] Date of Patent: Jul. 19, 1988

[54] ELECTRONIC PICTURE CAMERA WITH REDUCED MEMORY CAPACITY

[75] Inventors: Atsushi Kawahara; Toshihisa Kuroiwa, both of Kawasaki; Tadashi Ota, Tokyo, all of Japan

[73] Assignee: Nippon Kogaku K.K., Tokyo, Japan

[21] Appl. No.: 541,014

[22] Filed: Oct. 12, 1983

[30] Foreign Application Priority Data

Oct. 13, 1982 [JP] Japan .................. 57-178496

[51] Int. Cl.⁴ .................. H04N 9/07; H04N 5/93; H04N 9/81; H04N 9/87
[52] U.S. Cl. .................. 358/44; 358/41; 358/209; 358/213.11; 358/312; 358/314; 358/335; 358/336; 358/909; 360/10.1; 360/35.1; 360/38.1
[58] Field of Search .......... 358/41, 43, 44, 133, 358/160, 310, 312, 314, 331, 332, 333, 334, 335, 336, 340, 342, 345, 347, 348, 906, 209, 212, 213, 305, 260, 285, 293, 294, 296, 302, 75, 76, 78, 80, 12, 13, 909; 360/9.1, 10.1, 10.3, 24, 32, 33.1, 35.1, 38.1

[56] References Cited

U.S. PATENT DOCUMENTS

| | | | |
|---|---|---|---|
| 4,131,919 | 12/1978 | Lloyd et al. | 358/213 |
| 4,318,886 | 3/1982 | Kawahara et al. | 422/68 |
| 4,319,267 | 3/1982 | Mitsuya et al. | 358/75 |
| 4,541,010 | 9/1985 | Alston | 358/44 |
| 4,577,237 | 3/1986 | Collins | 358/336 |
| 4,586,082 | 4/1986 | Wilkinson | 358/336 |
| 4,614,966 | 9/1986 | Yunoki et al. | 358/44 |
| 4,651,227 | 3/1987 | Yunoki et al. | 358/909 |
| 4,667,317 | 5/1987 | Baggen | 360/32 |

*Primary Examiner*—James J. Groody
*Assistant Examiner*—Randall S. Svihla
*Attorney, Agent, or Firm*—Michael N. Meller

[57] ABSTRACT

A completely electronic color camera for electronically recording an image of an object. The image signals from a solid-state image sensor having color filters are converted to digital form so that the digitized image signals are applied to the same number of coding compression circuits, e.g. differential pulse code modulation circuits, as the kinds of colors of the color filters per scanning line, are subjected to a color separation coding processing and are then stored directly in a memory without performing any additional processing. Error detecting and correctng circuits are provided. Error detecting and correcting data and lens setting data are added to the image data and recorded. The camera is reduced in size, is low in power consumption and requires a reduced memory capacity per frame.

9 Claims, 8 Drawing Sheets

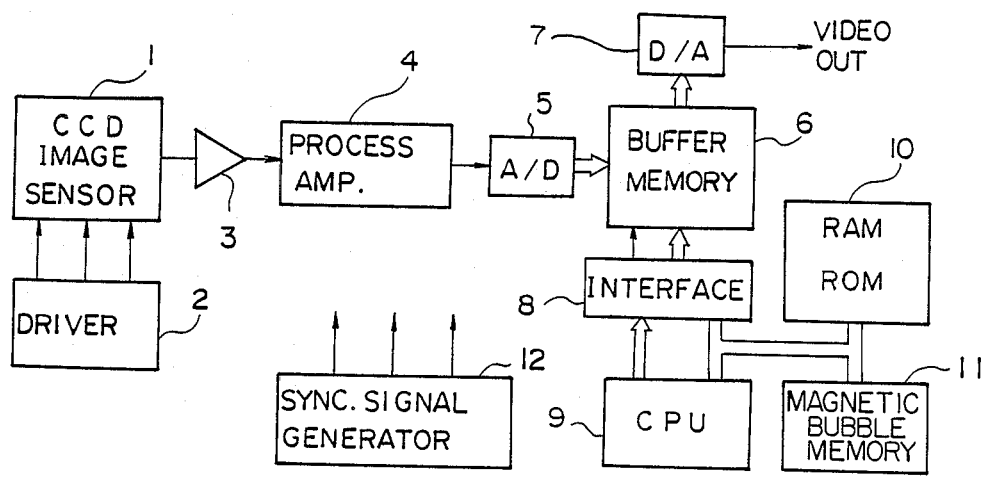

ELECTRONIC PICTURE CAMERA WITH
REDUCED MEMORY CAPACITY

BACKGROUND OF THE INVENTION

The present invention relates to an electronic picture camera of the type in which the image signals of an object picked up by a solid-state image sensor or the like are converted to digital signals and recorded.

Recently, in place of still and/or motion picture cameras for recording pictures on a sensitized film, portable electronic photography systems, e.g., electronic still and/or motion picture cameras for recording pictures on a magnetic tape or in magnetic bubble memory have made great technical advance.

While, in the past, an all solid-state electronic still camera has merely been the subject of investigation due to the restrictions imposed from the technical point of view, the possibility of its realization is now high owing to the advancement of integrated circuits, etc. As a result, the number of patent applications relating to electronic still cameras has been increased. A typical type of the electronic still cameras disclosed in these patent applications is shown in U.S. Pat. No. 4,131,919 in which the color separated outputs from the respective color filters of a color image sensor are converted by an NTSC color encoder to image signals so that the image signals are converted to digital signals and are then recorded in a buffer memory.

SUMMARY OF THE INVENTION

It is the primary object of this invention to provide an all solid-state electronic picture camera which is small in size, is low in power consumption and requires a reduced amount of storage capacity per frame.

To accomplish the above and other objects, in accordance with the invention there is thus provided an electronic picture camera so designed that the output of a solid-state image sensor having color filters is stored directly by simply providing the same number of coding compression means, e.g., differential pulse code modulators (DPCM), as the kinds of colors of the color filters per scanning line and performing the desired color-separation coding without effecting any other additional process.

BRIEF DESCRIPTION OF THE DRAWINGS

FIG. 1 is a block diagram schematically showing the construction of an electronic still camera.

FIGS. 2, 3 and 4 are schematic diagrams showing different exemplary color filter arrays used in the present invention.

DESCRIPTION OF THE PREFERRED EMBODIMENTS

Figure 5A:
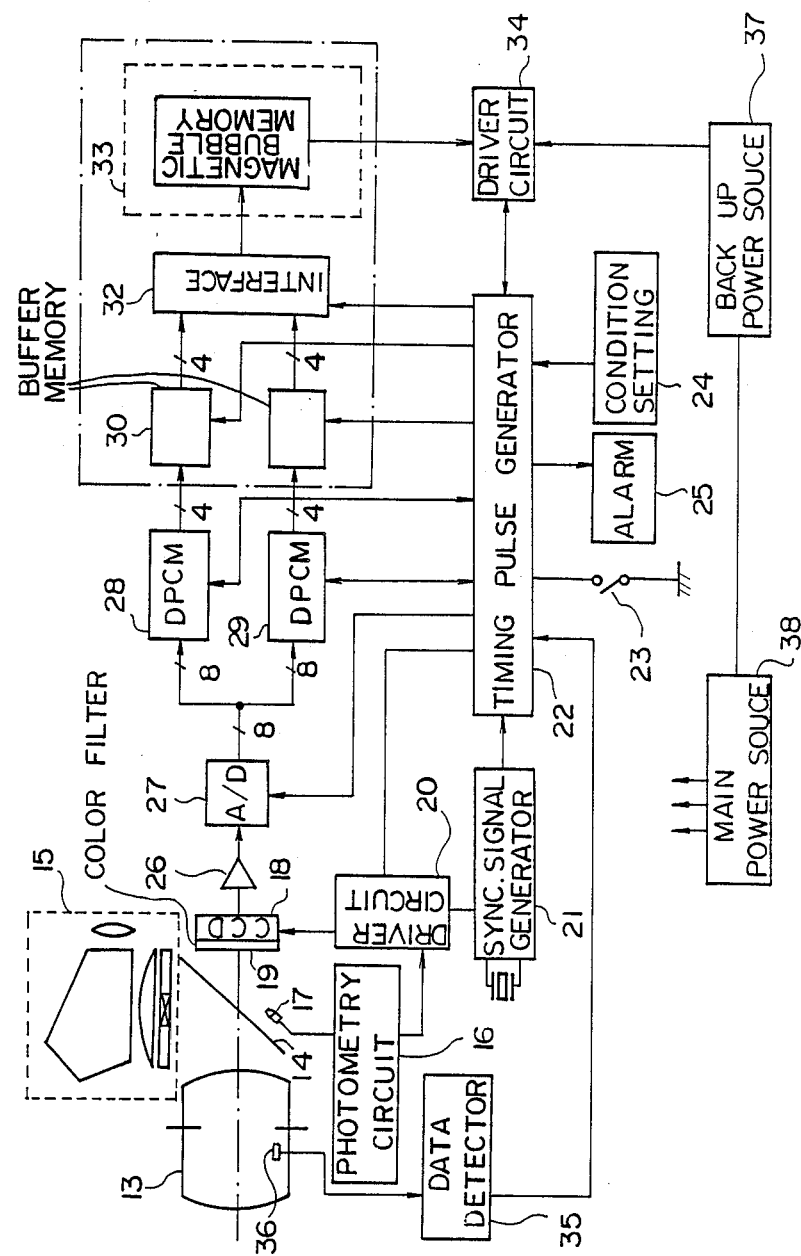
FIG. 5A is a block diagram showing an electronic picture camera according to an embodiment of the present invention.

FIG. 1 is a block diagram schematically showing the construction of an electronic still camera. In the Figure, numeral 1 designates a CCD (charge coupled device) solid-state image sensor, 2 a driver circuit for the image sensor 1, 3 a preamplifier for amplifying the output signal from the image sensor 1, and 4 a process amplifier for effecting the gamma correction or the like. However, where the CCD solid-state image sensor 1 comprises a single-plate color image sensor, the process amplifier 4 includes color separation circuits each for separating the output of a corresponding one of the color filters in the single-plate color image sensor and an NTSC color encoder circuit. The output video signals from the process amplifier 4 are converted to a digital form by, for example, an 8-bit A/D converter 5 and thus the television video signals for one field or frame are stored in a buffer memory 6. In this case, if the CCD solid-state image sensor 1 is a monochrome image sensor and the number of its horizontal picture elements is 512, then the storage capacity of the buffer memory 6 must be selected to be 1M-bits in the case of a field memory and 2M-bits in the case of a frame memory. Connected to the buffer memory 6 is a D/A converter 7 which is used for displaying the stored picture. Also, a CPU 9 of a microcomputer is connected to the buffer memory 6 through a memory interface 8 and the CPU 9 is connected through a bus line to peripheral units, i.e., a RAM/ROM memory 10 for storing a program, etc., and a magnetic bubble memory 11 for recording and storing image data. Numeral 12 designates a sync signal generator for supplying timing pulses to the individual circuits.

Due to the above-described construction, this electronic still camera has the following disadvantages.

The first disadvantage is that the memory capacity of the buffer memory 6 is very great. In particular, where the picture is taken in color and the output video signal of the processor amplifier 4 is an NTSC color signal, a frequency of as high as 14.31818 MHz or four times the color subcarrier frequency (3.579545 MHz) is required for the conversion frequency of the A/D converter 5 so that the sampling of 910 points per horizontal scanning line must be effected and thus the storage capacity of the buffer memory 6 must be nearly 2M-bits even in the case of a field picture. To incorporate such a large-capacity memory in a small camera is impractical from the standpoint of power consumption as well as the standpoint of volume.

The second disadvantage is that the contents of the buffer memory 6 are transferred to the magnetic bubble memory 11 through the CPU 9. If the data is subjected to a processing, e.g., compression processing by coding through the CPU 9, the time required for this purpose becomes so large that it is no longer negligible and the buffer memory 6 continues to operate during this time, thus increasing the power consumption.

Then, the third disadvantage is that in the case of color photography, such color signal processing circuits as color separation circuits, etc., are incorporated in the camera proper and this complicates the circuitry, thus increasing the power consumption and increasing the size of the camera itself.

FIGS. 2, 3 and 4 show some exemplary color filter arrays used in a single-plate color solid-state image sensor. FIG. 2 is a Bayer's type filter array which is typical of the mosaic filters, and FIG. 3 is a stripe filter array. FIG. 4 is an example of a filter array adapted for an arrangement of picture elements where a photosensor portion forms a hexagonal lattice. While, in this case, the filter colors used for the color filters comprise the primary colors of R(red), G(green) and B (blue) and the number of colors is three, these colors may of course be the complementary colors of magenta Mg, yellow Y and cyan Cy or the combinations of the all-color transmission white W.

In the below-mentioned embodiment, a solid-state image sensor is used in which the previously mentioned color filters are superposed on its photosensor portion.

FIG. 5A is a block diagram of an electronic picture camera according to an embodiment of the invention and the filters of the Bayer's array shown in FIG. 2 are used in this embodiment.

In FIG. 5A numeral 13 designates a phototaking lens having an iris, 14 a quick return mirror or half mirror, and 15 a finder optical system including a pentagonal prism. Numeral 16 designates a photometry circuit for receiving the output of a photosensitive element 17 to compute the proper shutter speed. Numeral 18 designates a solid-state image sensor having a shutter function and a color filter array 19 of the type shown in FIG. 2 is superposed and adhered to its photosensitive surface. Numeral 20 designates a driver circuit for the solid-state image sensor 18, which controls the writing and reading of signal charges in response to the output of the photometry circuit 16. The operation of the picture camera on the whole is controlled entirely in synchronism with the output pulses from a sync signal generator 21 including an oscillator. In this case, the various timing pulses required for use within the camera are produced by a timing pulse generator 22 which receives the output pulses from the sync signal generator 21 and simultaneously utilizes the ON/OFF state signal from a release switch 23 and the outputs of a shooting condition setting circuit 24.

Next, the shooting procedure will be described briefly. The operator first presets those shooting conditions, e.g., the selection between the rapid sequence shooting and the single shooting, the selection between the manual operation and the automatic operation and the necessity for any exposure correction in the shooting condition setting circuit 24, and then the release switch 23 is turned on, thereby causing the timing pulse generator 22 to reset the entire camera to the initial condition. When it is reset, the image sensor driver circuit 20 drives the image sensor 18 in accordance with the required shutter speed. In this case, any other operation than the shooting, e.g., warning is given by an alarm circuit 25 which utilizes a display by an LED or LCD or a warning by a buzzer.

Referring again to the description of the block diagram of FIG. 5A, numeral 26 designates a preamplifier for amplifying and adapting the output signal of the image sensor 18 to the input range of the following A/D converter 27. The output of the A/D converter 27 should preferably be 8 bits long. Also, if occasion demands, a white compression circuit may be inserted between the preamplifier 26 and the A/D converter 27 so as to ensure a better image.

Where the filters shown in FIG. 2 are used, the single-plate color solid-state image sensor 18 having the color filters 19 superposed thereon generates an output having a waveform in which the R and G signals or the B and G signals alternately appear repeatedly for each of the scanning lines. The A/D converter 27 subjects such an output to A/D conversion every picture element. In this case, it is of course possible to use two units of the A/D converter and reduce the conversion frequency by half.

The output of the A/D converter 27 or an 8-bit digital signal is applied to two DPCM circuits 28 and 29 representing an embodiment of coding compression means according to the invention. The DPCM circuits 28 and 29 are each completely comprised of a digital circuit and they operate in response to the output pulses from the timing pulse generator 22 so that the DPCM circuits 28 and 29 are shifted from each other by one period of the image sensor reading clock pulses and they operate at a frequency which is half the reading clock frequency. In this way, the DPCM circuits 28 and 29 operate so that, for example, for each scanning line, the DPCM circuit 28 encodes only the G signals and the DPCM circuit 29 encodes the R or B signals. Thus, each of these circuits generates a compressed 4-bit DPCM code signal as its output. Then, the timing pulse generator 22 has the function of separating the outputs of the A/D converter 27 in accordance with the color elements of the color filters and applying the same to the DPCM circuits 28 and 29 and it corresponds to an embodiment of separating means according to the invention.

RAM buffer memories 30 and 31 are respectively connected to the DPCM circuits 28 and 29 so that one of the RAM buffer memories 30 and 31 stores the G signals and the other stores the R or B signals for one picture.

The time required for subjecting the signal charges stored in the image sensor 18 to A/D conversion as well as DPCM coding and then storing the same in the buffer memories 30 and 31 must be such that the signal charges in the image sensor 18 are not deteriorated by the dark current. For instance, if this time is selected to be 33 msec and if the number of horizontal picture elements in the image sensor 18 is 512, then the reading clock frequency for a field picture (256 scanning lines) is about 4 MHz. Therefore, the corresponding operating clock frequency of the DPCM circuits 28 and 29 becomes 2 MHz. Also, the storage capacity of each of the buffer memories 30 and 31 becomes 256K-bits and this is a considerable reduction of the required storage capacity as compared with the previously mentioned prior art method. The storage capacity of 256K-bits can be provided by using four packages of the commercially available RAM of 64K-bits. Alternatively, it can be provided by using one package of the commercially available RAM of 256K-bits and this greatly reduces the size of the apparatus. The data for each picture thus stored in the buffer memories 30 and 31 are then immediately sent, along with the required additional data, such as an error detection (correction) code and shooting condition data (e.g., the type of the phototaking lens, the shutter speed, the aperture setting and the date), to a magnetic bubble cassette 33 through a magnetic bubble memory interface 32. Numeral 34 designates a magnetic bubble driver circuit. The single magnetic bubble cassette 33 includes, for example, four units of the 4-M-bit magnetic bubble memory and thus it has a total storage capacity of 16M-bits. Since the data for each field picture is limited to 512K-bits as mentioned previously, 32 pictures can be stored in the single magnetic bubble cassette 33.

Thus, in accordance with the present embodiment, the RAM buffer memories 30 and 31, the magnetic bubble memory interface 32 and the magnetic bubble cassette 33 form storage means according to the invention.

Numeral 35 designates a data detection circuit for detecting the type of lens and the aperture setting for shooting and the required means for detecting these data from the lens can be realized by any known method. In accordance with this embodiment, this is realized by supplying the power to the lens side via a plurality of contacts arranged on the lens mount and digitally reading the lens data (e.g., the open F-number and the focal distance) from a ROM incorporated in the lens barrel and the aperture setting from an encoder operatively associated with the aperture-control ring. To decrease the number of contacts, the transmission of data can be advantageously effected in a serial manner. For this purpose, a data generating circuit 36 comprises an IC and it is packaged, along with the ROM, in one chip.

Also, as shown in FIG. 5A, the electronic picture camera according to the invention includes two different types of power sources 37 and 38. The power source 38 serves as a main power source and the other power source 37 serves as a back-up power source. Usually, it is constructed so that when the main power source 38 is turned on, a current is supplied from the main power source 38 to a large-capacity capacitor or small secondary cell and this is used as the back-up power source 37 for driving the bubble cassette 33. In this case, as regards other circuits which are to be driven, along with the bubble cassette 33, by means of the back-up power source 37, the optimum combination is determined in consideration of the power consumption, the noise margin for variation of the power source, etc.

By virtue of the provision of this back-up power source 37, despite the fact that a large current is required for driving the bubble cassette 33, there is practically no variation in the power supply to the other circuits, allowing them to operate stably. Also there is no need to temporarily draw a large current from the main power source 38, thus preventing the main power source 38 from being restricted by its internal resistance and thereby extending the range of cells usable for the main power source 38.

In accordance with this embodiment, as shown in FIG. 5A, it is so arranged that during the transfer to the magnetic bubble cassette 33 of the data for each picture stored in the buffer memories 30 and 31, each comprising a semiconductor RAM, the power is supplied to the magnetic bubble cassette 33 only for a short interval of time between the beginning and end of the transfer of the data to the magnetic bubbles. As a result, in either of the heretofore known magnetic bubble drive systems, i.e., the magnetic field drive system of transferring the bubbles by a rotating field and the current drive system of effecting the transfer by supplying current pulses to the conductor loop, it is possible to overcome the disadvantages with respect to the cell driving, that is, the required current becomes excessively large and thus the output voltage drops due to the internal resistance of the cell, thereby affecting not only the magnetic bubbles but also the other circuits, such as, the shooting, A/D conversion, coding and buffer memory circuits.

Next, the previously mentioned additional data will be explained. As mentioned previously, vertically 256 scanning lines are provided for each picture. However, when considering the television display, a number of effective scanning lines equal to 240 in the vertical direction is sufficient and it is possible to use the remaining 16 scanning lines or 32K-bits (or 16K-bits for each of the DPCM channels) for storing other data than the picture. In this embodiment, an error detecting code which is essential for handling the shooting conditions and digital data are assigned to this area. Even if the picture comprises a frame picture, the situation is the same except that the number of scanning lines in the vertical direction is doubled.

As described so far, the present invention features that a picture is directly stored by simply providing the same number of DPCM circuits as the number of types of color filters per scanning line placed on a solid-state image sensor and subjecting the output of the image sensor to color separation encoding without performing any other additional processing.

Figure 6:
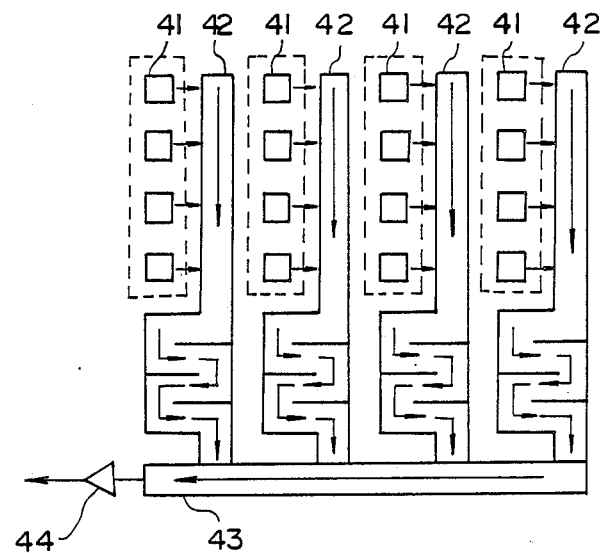
FIG. 6 is a block diagram showing an example of an image sensor used in the invention.

FIG. 6 is a plan view showing an example of a CCD solid-state image sensor having an electronic shutter function, which is used in the electronic picture camera according to the invention. In the Figure, designated at 41 and enclosed by dotted lines are photodiodes and only those portions enclosed by the broken lines are always exposed. The remaining portions are shielded from light. Numeral 42 designates vertical transfer CCDs for transferring the signal charges generated by the photodiodes 41 in the vertical direction, and the lower half of each CCD 42 has a zigzag configuration, thereby reducing the required chip size. At the instant that the signal charges are transferred parallel to the upper halves of the vertical transfer CCDs 42, the signal charges are transferred to the lower halves or the zigzag configuration portions so as to prevent the occurrence of a smear phenomenon. Thereafter, a horizontal transfer CCD 43 is operated in association with the operation of the vertical transfer CCDs 42 and thus the signal charges are read out from an image sensor output amplifier 44.

This image sensor construction provides the image sensor itself with a shutter function in that the time interval between two successive transfers to the vertical transfer CCDs 42 from the photodiodes 41 (i.e., the shutter time) is controlled and the charges transferred for the second time are generated as signals.

Figure 5B:
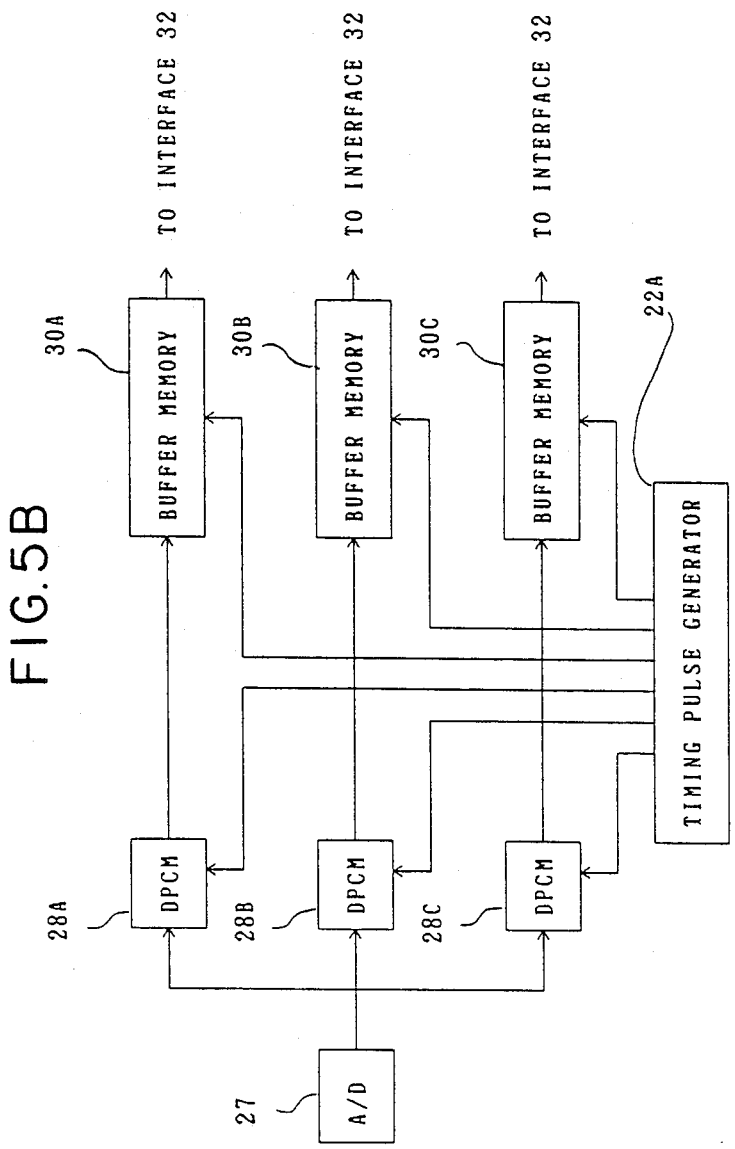
FIG. 5B is a block diagram showing a part of an electronic still picture camera provided with the color filter shown in FIG. 4.

Next, a brief description will be given of a case employing the filters of FIGS. 3 and. In these cases, the R, G and B signals of each scanning line are sequentially outputted and therefore three DPCM circuits are required. However, referring to FIG. 5B, in the filter shown in FIG. 4 the operating frequency of DPCM circuits 28A, 28B and 28C from a timing pulse generator 22A can be reduced to one third of the reading clock frequency. The timing pulse generator 22A controls buffer memories 30A, 30B and 30C. Generally, the power consumption of a digital circuit such as a CMOS circuit can be considered to be proportional to the operating frequency and therefore it can be considered that there is no increase in the power consumption due to the use of the three circuits. In these cases, once the signals are recorded, their addresses in the memory are known and therefore the necessary processing is performed when the signals are to be displayed on a television receiver or their hard copy is to be produced.

Figure 7:
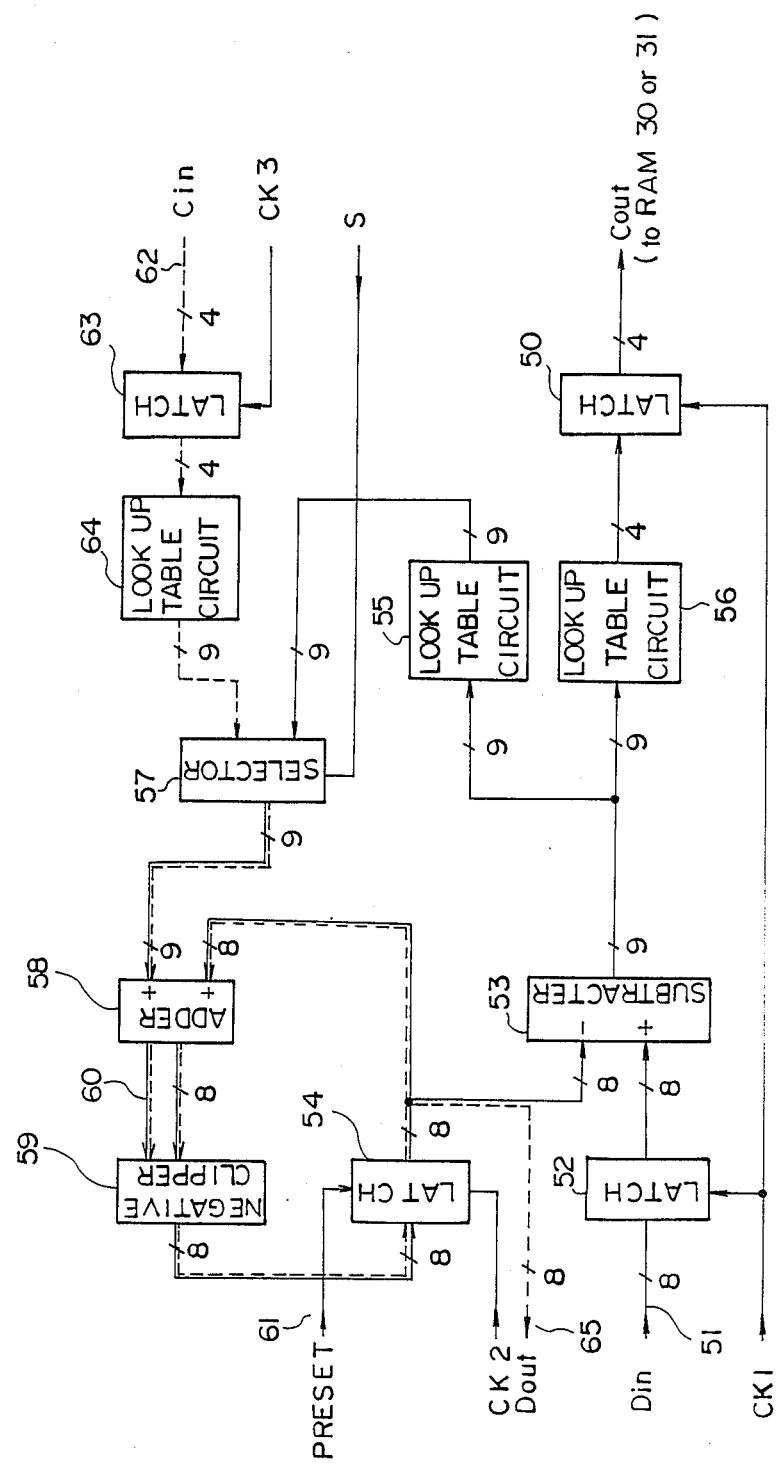
FIG. 7 is a block diagram showing an embodiment of a DPCM circuit.

FIG. 7 is a block diagram showing an example of the DPCM circuits forming coding compression means used in the electronic picture camera according to the present invention. In the Figure, the solid lines indicate the flow of data when the circuit is used for modulating purposes and the broken lines indicate the flow of data when the circuit is used for demodulating purposes.

In FIG. 7, the 8-bit output signal of the A/D converter 27 shown in FIG. 5A is applied to a data input terminal 51. This data is read into and stored in an 8-bit latch circuit 52 in response to clock pulses $CK_1$. In this case, the frequency of the clock pulses $CK_1$ is one half that of the image sensor reading clock pulses (when the filters of Bayer's array are used). The output of the latch circuit 52 is connected to one input terminal of a subtracter 53 and the other input terminal of the subtracter 53 receives the output of another latch circuit 54, which output is a value preliminarily estimated from the previous value. Thus, the difference between the two inputs is generated as an output of the subtracter 53 in the form of a 9-bit output signal including a sign bit. During the coding, the same pulses are applied as the clock pulses $CK_1$ and $CK_2$ to the latch circuits 52 and 54, respectively. A specific code is assigned to the difference between the estimated value and the actual value by look-up table circuits (each comprising an ROM or gate circuit) 55 and 56, respectively. Thus, a 4-bit DPCM code generated from the circuit 56 has a relationship of a one-to-one correspondence to a 9-bit DPCM code generated from the circuit 55. In other words, the numerical value indicated by the output of the subtracter 53 is grouped by the look up table circuit 56 in accordance with the range of the absolute value of the numerical value and its positive or negative sign and a 4-bit signal indicative of the group is generated. Also, the look-up table circuit 55 converts the numerical value indicated by the output of the subtracter 53 to a 9-bit signal indicative of a typical value in the group of the numerical value mentioned previously.

The 4-bit output from the look-up table circuit 56 is then read by a latch circuit 50 in synchronism with the clock pulses $CK_1$ and it is then supplied to the buffer memory 30 or 31 of FIG. 5A. On the other hand, the 9-bit output from the look-up table circuit 55 is applied to one input terminal of an adder 58 via a selector 57. The output of the look-up table circuit 55 is added to the 8-bit output applied to the other input terminal of the adder 58 from the latch circuit 54 and representing the previous estimated value, thereby producing a new estimated value. Note that while the 9-bit input data to the adder 58 can assume a positive or negative value, the 8-bit input data is always either a positive or zero value. Therefore, whether the output of the adder 58 is positive or negative is not certain. Thus, a negative clipper circuit 59 is provided to always convert the adder output to a non-negative value. In other words, the negative clipper circuit 59 generates a zero value when the sign bit output 60 of the adder 58 indicates the negative sign and it generates the applied 8-bit input as such when the sign bit 60 indicates the positive sign. A predetermined value is always preset into the latch circuit 54 at the beginning of each horizontal scanning and usually the half value of the amplitude is preset. The preset terminal is designated at 61.

The above-described initial value setting and the estimated value generation are performed repeatedly for the respective scanning lines and the desired DPCM coding is performed.

Next, the DPCM coding will be explained.

During the demodulation, the data flow as shown by the broken lines in FIG. 7 and the lower half of the Figure is not used. The demodulation of the DPCM is not necessary in the embodiment of FIG. 5A. Note that the selector 57 is provided to enable both DPCM modulation and demodulation. During the initial period of the decoding, that is, at the beginning of each horizontal scanning line, the latch circuit 54 is present in the same manner as mentioned previously. At the same time, an input is applied from a DPCM code 4-bit input terminal 62 and it is read into a latch circuit 63 by means of clock pulses $CK_3$. The output of the latch circuit 63 is applied to a third look-up table circuit 64 and converted to a 9-bit code having a relationship of a one-to-one correspondence with the input 4-bit code. In other words, the look-up table circuit 64 receives the 4-bit signal indicative of the group of the numerical value explained in connection with the look-up table circuit 56 and it generates the 9-bit signal indicative of the typical value in the group of the numerical value explained in connection with the look-up table circuit 55. The output of the look-up table circuit 64 is further passed through the selector 57 which selects the upper input during the decoding, added to the initial value in the adder 58 and passed via the negative clipper circuit 59, thereby providing a new estimated value. In accordance with the clock timings of the associated succeeding clock pulses $CK_2$ and $CK_3$, the new estimated value is applied to the latch circuit 54 and a new signal is applied to the latch circuit 63, respectively. Thereafter, this process is repeated. This operating frequency of the DPCM circuit is, for example, 2 MHz or 500 nsec in terms of the period in the case of FIG. 2 and this can be easily realized by a CMOS IC. The decoded 8-bit data is delivered as the output of the latch circuit 54 from an output terminal 65.

Now an embodiment of the error detecting (correcting) method will be described.

Figure 8:
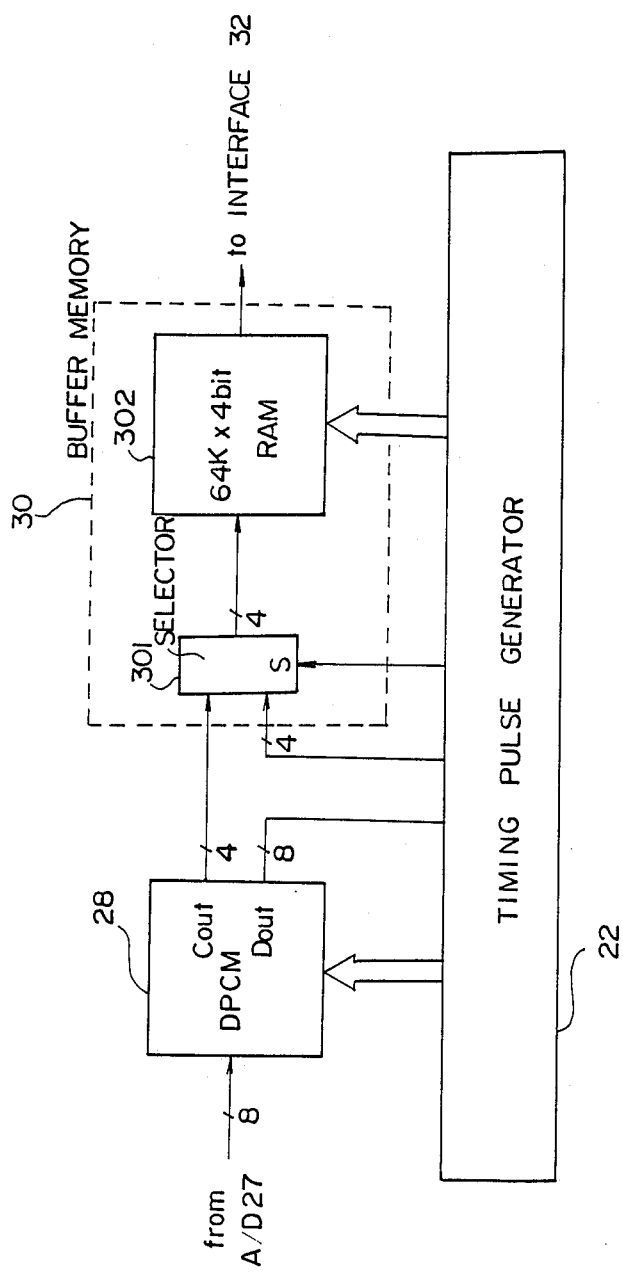
FIG. 8 is a block diagram of a circuit whereby such additional information as error detecting and correcting data and the shooting conditions are added to the image data and recorded.

In the electronic picture camera according to the present invention, the output signals of the image sensor are immediately converted to a digital form and all of the subsequent processings are performed digitally. In this case, the greatest consideration must be given to the method of detecting and correcting code errors. In accordance with the invention, this is accomplished by means of a circuit construction such as shown in FIG. 8. Designated by numeral 28 in the Figure is the DPCM circuit shown in FIG. 7. Designated by numeral 30 is a buffer memory of the type shown in FIG. 5A and it comprises a RAM 302 having a 64K-bit×4 bit configuration. Also, a selector 301 is provided in the input section of the buffer memory 30 so that the data from the DPCM circuit 28 and the timing pulse generating circuit 22 are applied to the input of the RAM 302.

In the case of the DPCM modulation and demodulation, each estimated value which results in a previous value is used one after another. Thus, if any error is caused by the occurrence of noise or the like in the course of the modulation or demodulation, all the subsequent data for the scanning line become erroneous. Thus, in accordance with the present embodiment, a method is used in which in the coding of each scanning line the 8-bit final estimated value from the DPCM circuit 28 is divided into two 4-bit data of the final estimated value which are stored, along with the coded 4-bit picture data, in the RAM 302 by the timing pulse generating circuit 22. Also, in this case, the same data forming the final estimated value is stored at three or more locations in the RAM 302 for the error detection of the final estimated value itself.

Since the final estimated value is an 8-bit data, assuming that this data is stored at three locations for each of the 240 scanning lines, the required storage capacity is 5.76K-bits for the signals of each color filter and these data can be fully accommodated with the preliminarily provided additional data storage capacity of 16K-bits. There still remains the storage capacity of over 10K-bits, which are in turn used for the storage of such data as the shutter speed, the aperture setting, the lens data and the date. Thus, the lens must be provided with means for transmitting its type and aperture setting.

During the decoding for reproduction, if the final estimated value resulting from the decoding for any scanning line differs from the final estimated value stored in the course of the shooting, it is considered that there is an error in this scanning line and an interpolation is effected in accordance with the adjacent scanning line data. This interpolation can be effected easily, since the data are completely digitized and the restrictions in time are less severe during the reproduction than during the shooting and recording. Note that while, in FIG. 8, only half of the DPCM circuits and the buffer circuits are shown, the same applies to the remaining one channel.

Next, a description will be given of the reproduction of a picture taken by the electronic picture camera employing the hexagonal lattice filter array of FIG. 4.

In the case of the hexagonal lattice type, if the central picture element is assumed to be R, the surrounding adjacent six picture elements include no R picture elements but include three G picture elements and three B picture elements. This is also the same in cases where the central picture element is G or B.

In the reproduction using such a color filter array, if any picture element is noted as being the central picture element, the color of the central picture element is determined by interpolation in accordance with two kinds of color signals which comprise the six adjoining picture elements.

Figure 9:
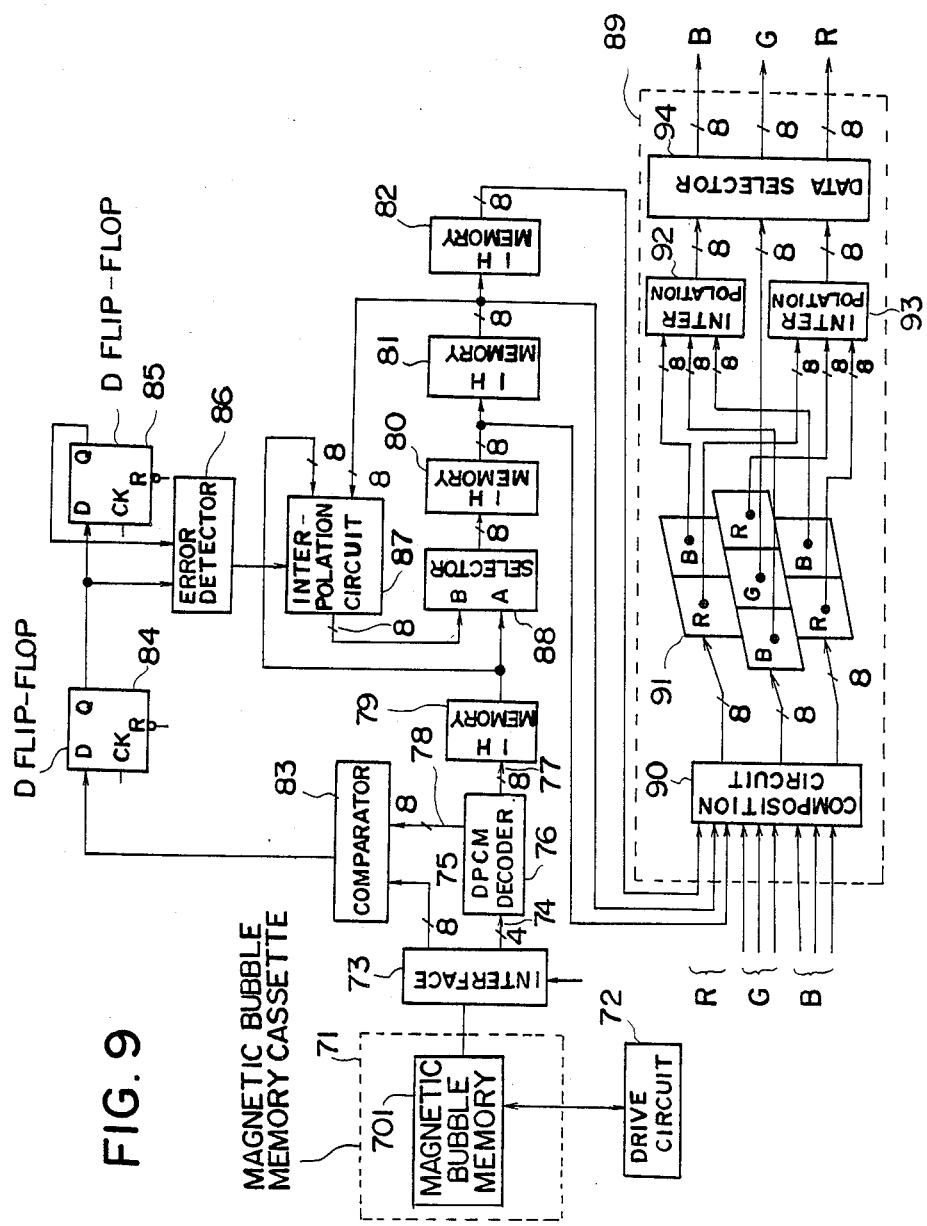
FIG. 9 is a block diagram showing an embodiment of a playback apparatus for reproducing the picture taken by an electronic picture camera according to the invention.

FIG. 9 is a block diagram showing the principal parts of a playback apparatus for reproducing pictures taken by using the color filter array of FIG. 4.

In the Figure, numeral 71 designates a magnetic bubble memory cassette which was removed from the camera proper and set in the playback apparatus. A magnetic bubble memory 701 is connected to a drive circuit 72 and a memory interface circuit 73 which are provided in the playback apparatus, and the recorded picture data and additional information data are read from the magnetic bubble memory 701. Of these data, the DPCM code data of 4 bits is indicated by numeral 74 and the final estimated value output of 8 bits is indicated by numeral 75.

Numeral 76 designates a DPCM decoder circuit of the type shown in FIG. 7 for generating a decoded data 77 and a final estimated value 78. Numerals 79 to 82 each designates 1H memory in which the picture data for one scanning line can be stored and from which the picture data can be read, and the 1H memory 79 stores the decoded picture data in synchronism with the reading of the data from the magnetic bubble memory 701.

After the decoded data for a scanning line has been written into the 1H memory 79, the three final estimated values are successively read out as the outputs 75 from the magnetic bubble memory 701 and compared with the final estimated data value 78 from the DPCM decoder circuit 76 by a comparator circuit 83. If the two or more of the three final estimated values coincide with the output 78 from the DPCM decoder circuit 76, the comparator circuit 83 generates a logical 0 at its output. On the contrary, if the two or more do not coincide with the output 78, it is considered that there is an error and the comparator circuit 83 generates a logical 1. The output of the comparator circuit 83 is connected to two D flip-flop circuits 84 and 85 connected in a shift register configuration and each having a reset terminal. These flip-flops serve as flags for indicating the presence or absence of any error in the data in the 1H memories 79 and 80, respectively.

Numeral 86 designates an error detector circuit for receiving the outputs of the flip-flop circuits 84 and 85 serving as flags and generating an error correcting command when there is an error. Numeral 87 designates an interpolation circuit responsive to the correcting command to interpolate (or replace) with the adjacent scanning line information. Numeral 88 designates a selector for suitably selecting one or the other of an ordinary data input A and an interpolated data input B.

With the construction described above, in accordance with the present invention the content of the 1H memory 80 can be interpolated or replaced by means of the preceding and following 1H memories 79 and 80.

Now, let us consider conditions in which such error occurs.

Firstly, if an error occurs early in the initial condition or in the first scanning condition, there is no other way but to correct the error with respect to the subsequent data. Thus, the data of the first scanning line is transferred from the 1H memory 79 to the 1H memory 80 so that the next scanning line data is stored in the 1H memory 79 and it is detected by the error detector circuit 86 if it is correct. In addition, the content of the 1H memory 80 is replaced with the content of the 1H memory 79 by the selector 88. If the next scanning line data is not correct, it is left as such. By so doing, it is possible to eventually obtain a correct data by the 1H memory 80 unless errors occur successively in the first several scanning lines. Also, since the picture information including the first scanning line is included in the blanking period, any error in this interval brings about no serious practical impediment.

Next, the occurrence of an error in the picture middle portion will be described.

With the picture middle portion, even if any error has occurred, the 1H memories 81 and 82 are storing the data obtained by interpolating or replacing the erroneous data. Then, if the data involving the error is transferred to the 1H memory 80 and if the flag flip-flop circuit 85 is set to "1", the state that can be assumed by the next scanning line data is either correct or incorrect. The flag flip-flop circuit 84 is set to "1" if the content of the 1H memory 79 is not correct and it is set to "0" if the content is correct.

If the content of the 1H memory 80 is incorrect and the content of the 1H memory 79 is correct, then the selector 88 replaces the content of the 1H memory 80 with the interpolated value calculated by the interpolation circuit 87 from the contents of the 1H memories 79 and 81. On the other hand, if the content of the 1H memory 80 is incorrect and the content of the 1H memory 79 is also incorrect, the selector 88 replaces the content of the 1H memory 80 with the content of the 1H memory 81, which is the data by the preceding scanning.

After this correcting operation, the flag flip-flop circuit related to the corrected 1H memory 80 is reset. As a result, the erroneous data are no longer contained in the 1H memories 80 to 82.

The foregoing description has been made with respect to one color of the color filters. In the case of FIG. 4 including the filters of three colors, similar circuits for two other channels are also used.

These data are applied first to a color signal composition and interpolation circuit designated by numeral 89 in FIG. 9 so that a composition circuit 90 generates the same color sequential signals as the output of the single-plate image sensor. Connected to the outputs of the composition circuit 90 is a window area generating circuit 91 including shift registers so as to simultaneously and parallely stick out the outputs of the seven nearby picture elements of the three adjacent scanning lines. This makes possible selective parallel calculations of the picture on the whole. The window area generating circuit 91 is so designed that two-color information of the six picture elements arranged adjacent the central picture element and one-color information of the central picture element are generated in parallel and the values of the two colors of the central picture elements are obtained by interpolation from the signals of the two adjoining colors. For instance, if the central picture element is a G signal as shown in FIG. 9, R and B signals are generated as the nearby picture elements. These nearby picture element output signals are separated into separate colors and are operated on by two interpolation circuits 92 and 93, thereby providing the signals of three colors with respect to the central picture elements. Of course, the color of the central element and the colors of the nearby picture elements change the combinations of the three colors and it is necessary to use a data select or 94 to always deliver the same color signals from the same line.

The reproduced color signals obtained in this way are displayed or used for hard copy producing purposes through a buffer memory. In the above description, the required control signals are not shown for purposes of simplification. Thus, what has heretofore been possible only for the correlation between two scanning lines is now possible among three scanning lines.

Thus, the present invention has the advantage of easily reducing the size and weight of a camera proper and the power consumption in that complicated processes can be assigned to the playback apparatus. Where the circuitry of FIG. 9 is to be applied to the Bayer's type color filter array shown in FIG. 2, this can easily be realized by performing the required interpolation in consideration of the R and B line sequential of the Bayer's type filter array and changing the selective parallel area of the window area generating circuit 91 of FIG. 9 to one including eight nearby picture elements around the central picture element.

Figure 10:
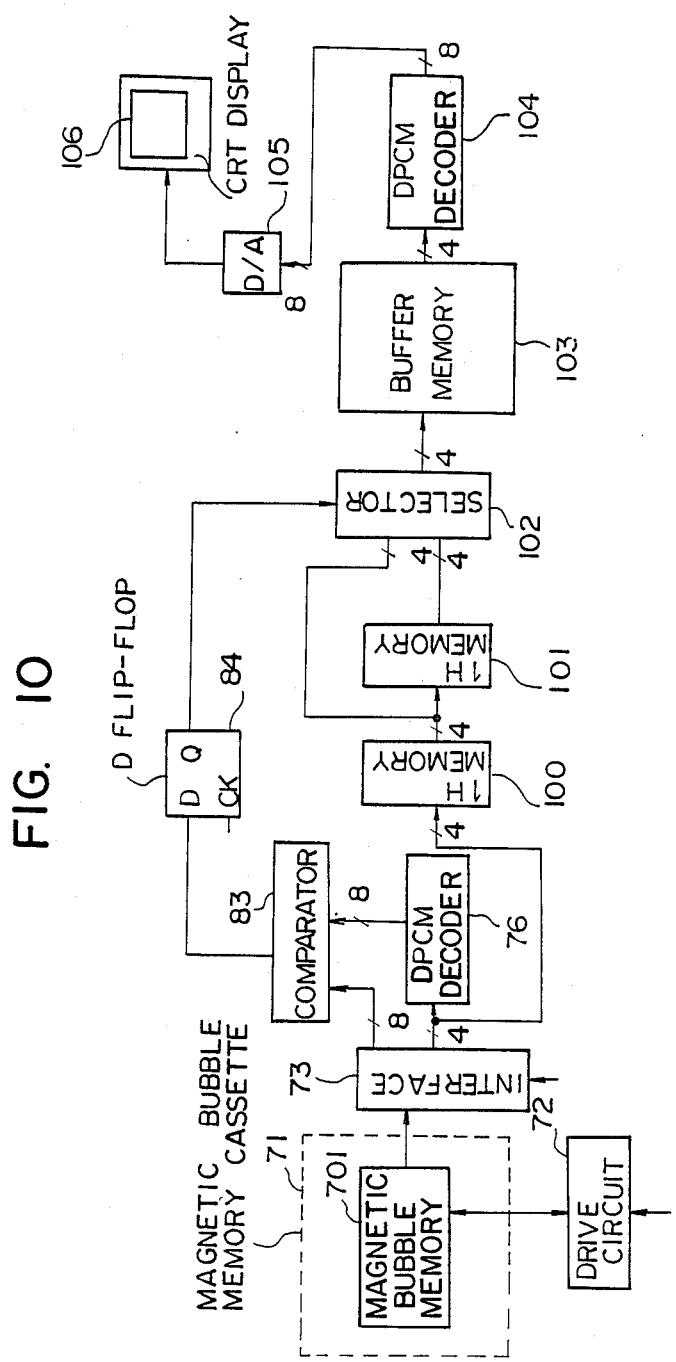
FIG. 10 is a block diagram showing another embodiment of the playback apparatus shown in FIG. 9.

FIG. 10 is a block diagram showing the principal parts of another embodiment of the picture playback apparatus. In FIG. 10, a magnetic bubble memory cassette 71, a magnetic bubble memory 701, a memory drive circuit 72, a memory interface circuit 73, a DPCM decoder circuit 76, a comparator circuit 83 and a flag flip-flop circuit 84 all operate in the same manner as their counterparts in FIG. 9. The only difference from FIG. 9 is that a DPCM decoder circuit 76 is used only for error detecting purposes and in this case each of 1H memories 100 and 101 stores a 4-bit DPCM code data as such. Then, if there is an error in a new scanning line so that the flip-flop circuit 84 is set to "1", a selector 102 selects the 1H memory 101 and its content is stored in a buffer memory 103 for one picture. A high-speed DPCM decoder circuit 104 is connected to the output of the buffer memory 103 so that while decoding the contents of the buffer memory 103 in a real-time manner, the same contents are converted to an analog form by a D/A converter 105 and are displayed on a CRT display 106.

The above-described construction has the advantage of reducing the buffer memory capacity by half. Of couse, the DPCM decoder circuits 104 and 76 may be reduced to one circuit which serves the two functions in common. Also, the description of this embodiment is the same as the description of FIG. 9 in that the processing of color signals by only one channel is illustrated.

From the foregoing description it will be seen that the electronic picture camera according to the invention is adapted for converting the image signals from a solid-state image sensor having color filters to digital signals, separating the digital signals for each horizontal scanning line by the color elements of the color filters, encoding the respective color element signals by coding compression means and directly storing the compressed signals in a storage medium by storing means, thereby reducing the storage capacity of the storing means and the storage medium for every frame, with a resulting reduction in size and weight of the camera proper and elimination of movable parts and enhanced reliability of the electronic picture camera.

Also, by virtue of the fact that the image signals are stored in a storage medium by simply performing the color separation coding by coding compression means instead of processing the signals by a CPU and storing the signals, there is the effect of eliminating the need for a time corresponding to the processing time of the CPU, thus simplifying the circuit construction, reducing the power consumption, reducing the repetition period of successive shots and making rapid sequence shooting possible.

What is claimed is:

1. A system including an electronic camera for electronically storing an image of an object, and an apparatus for reproducing the object image stored in the electronic camera,
   (a) said electronic camera comprising:
      (i) pickup means for performing a horizontal scanning operation with respect to said object image to divide said object image into a given number of picture elements and to generate an output signal indicative of each picture element of said object image,
      (ii) coding means for coding the output signals of said pickup means and generating coded signals,
      (iii) first decoding means for decoding one of said coded signals corresponding to an output signal of said pickup means indicative of a final picture element in one of a plurality of horizontal scanning lines formed by said horizontal scanning operation performed by said pickup means and generating at least one first decoded signal,
      (iv) a first storage means, and
      (v) means for writing said coded signals and said at least one first decoded signal into said first storage means, and (b) said reproducing apparatus comprising:
  (i) means for reading said coded signals and said at least one first decoded signal from said first storage means,
  (ii) second decoding means for decoding said read coded signals and generating second decoded signals, and
  (iii) comparison means for comparing said at least one first decoded signal with one of said second decoded signals which corresponds to said final picture element in said one of said plurality of horizontal scanning lines.

2. A system according to claim 1, wherein said coding means comprises means for converting the output signals of said pickup means to digital signals, and means for subjecting said digital signals to differential pulse code modulation.

3. A system according to claim 1, wherein siad comaprison means comprises means for detecting that said at least one first decoded signal is different from said one of said second decoded signals and outputting a detection signal.

4. A system according to claim 3, wherein said reproducing apparatus further comprises a second storage means, means for writing some of said second decoded signals corresponding to said one of said plurality of horizontal scanning lines into said second storage means and means responsive to said detection signal to write some of said second decoded signals corresponding to another of said plurality of horizontal scanning lines into said second storage means instead of said one of said second decoded signals corresponding to said one of said plurality of horizontal scanning lines.

5. An electronic camera including a color filter for separating an image of an object into a plurality of colors and a solid-state image sensor for scanning the object image through said color filter to detect the object image picture element by picture element and to generate an image signal formed by a plurality of horizontal scanning lines, each of which includes a plurality of picture elements, said electronic camera comprising:
  (a) means for converting said image signal to digital signals, each of which corresponds to a respective one of said picture elements;
  (b) coding means for separating said digital signals into a plurality of channels and thereafter coding said separated digital signals;
  (c) storage means; and
  (d) means for writing said coded signals into said storage means;
wherein said coding means is provided with modulation means for subjecting said digital signals of each of said channels to differential pulse code modulation, each of said modulation means having latching means for latching a value therein, subtracter means for computing a differnce between said value latched in said latching means and the value of one of said digital signals and outputting an output signal indicative of said difference, first discriminating means for discriminating the one of a plurality of predetermined groups to which the value of the output signal of said subtractor means belongs, second discriminating means for converting the output signal of said subtractor means into an output signal indicative of a value typical of values within said one of said predetermined groups to which the value of the output signal of said subtracter means belongs, and adder means for calculating a sum of the value of the output signal of said second discriminating means and said value latched in said latching means and generating an output signal of the basis of said sum, said latching means replacing said value latched therein with the value represented by said output signal of said adder means, said adder means comprising means for outputting an output indicative of zero when said sum is negative and outputting an output signal indicative of said sum when said sum is positive, and further comprising means for writing a final value latched in said latching means for each of said plurality of horizontal scanning lines into said storage means.

6. An electronic camera including a color filter for separating an image of an object into a plurality of colors and a solid-state image sensor for scanning the object image through said color filter to detect the object image picture element by picture element and to generate an image signal formed by a plurality of horizontal scanning lines, each of which includes a plurality of picture elements, said electronic camera comprising:
  (a) means for converting said image signal to digital signals, each of which corresponds to a respective one of said picture elements;
  (b) coding means for separating said digital signals into a plurality of channels and thereafter coding said separated digital signals;
  (c) storage means; and
  (d) means for writing said coded signals into said storage means;
wherein said coding means is provided with modulation means for subjecting said digital signals of each of said channels to differential pulse code modulation, each of said modulation means having latching means for latching a value therein, subtractor means for computing a difference between said value latched in said latching means and the value of one of said digital signals and outputting an output signal indicative of said difference, first discriminating means for discriminating the one of a plurality of predetermined groups to which the value of the output signal of said subtractor means belongs, second discriminating means for converting the output signal of said subtractor means into an output signal indicative of a value typical of values within said one of said predetermined groups to which the value of the output signal of said subtractor means belongs, and adder means for calculating a sum of the value of the output signal of said second discriminating means and said value latched in said latching means and generating an output signal on the basis of said sum, said latching means replacing said value latched therein with the value represented by said output signal of said adder means; and further comprising means for writing a final value latched in said latching means for each of said plurality of horizontal scanning lines into said storage means.

7. In a system including an electronic camera for producing an image signal indicative of an image of an object and storing said image signal, and an apparatus for reproducing said image signal stored in the electronic camera,
  (a) said electronic camera comprising:
    (i) pickup means for performing a horizontal scanning operation with respect to said object image to divide the object image into a plurality of picture elements which have a given number of colors in such a manner that each of said plurality of picture elements has only one of said given number of colors and that ones one of said picture elements adjoining in a direction of said horizontal scanning operation differ in color from each other, said pickup means producing output signals each of which represents a light intensity of a respective one of said plurality of picture elements,
  (ii) storage means, and
  (iii) writing means for writing said output signals into said storage means, and
(b) said reproducing apparatus comprising:
  (i) means for reading said output signals written into said storage means, and
  (ii) interpolation means for producing, a plurality of interpolation signals for a selected one of said plurality of picture elements, each of said interpolation signals corresponding to a different one of said given number of colors other than the color of said selected picture element and being produced on the basis of the one of said read output signals corresponding to said selected picture element and ones of said read output signals corresponding to ones of said picture elements which are in the vicinity of said slected picture element and which have said different one of said given number of colors.

8. A system according to claim 7, wherein said pickup means comprises a plurality of color filters for dividing said object image into said given number of colors, and a solid-state image sensor for picking up said object image divided by said color filters.

9. A system according to claim 7, wherein said writing means comprises means for converting the output signals of said pickup means to digital signals; and means for subjecting said digital signals to differential pulse code modulation.

* * * * *